Patented Aug. 19, 1924.

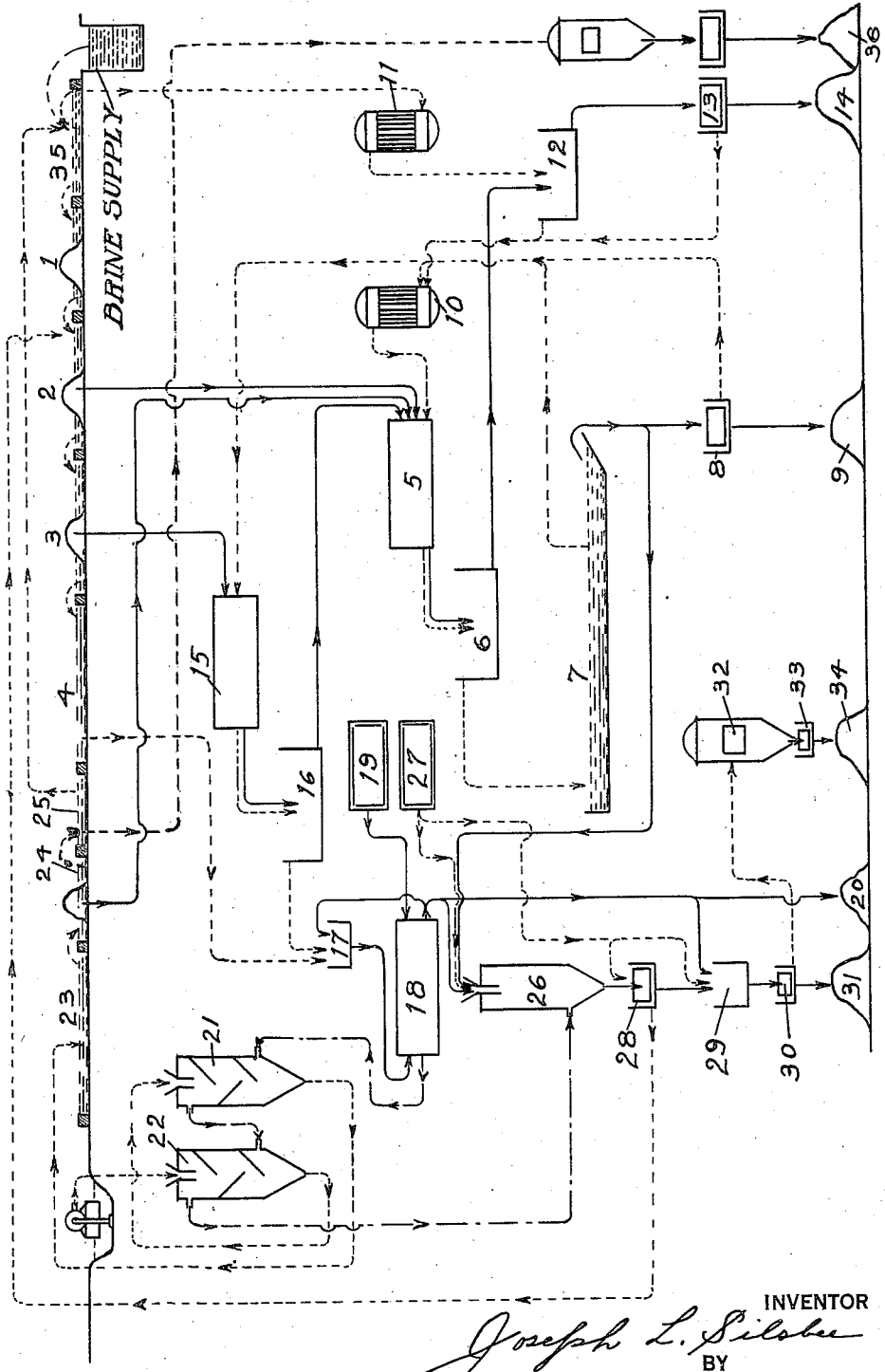

1,505,295

UNITED STATES PATENT OFFICE.

JOSEPH L. SILSBEE, OF SALT LAKE CITY, UTAH.

METHOD OF RECOVERY OF POTASSIUM AND MAGNESIUM SALTS FROM NATURAL BRINES AND CALCAREOUS MUDS.

Application filed July 27, 1920. Serial No. 399,338.

*To all whom it may concern:*

Be it known that I, JOSEPH L. SILSBEE, a citizen of the United States, residing at Salt Lake City, in the county of Salt Lake and State of Utah, have invented certain new and useful Improvements in Methods of Recovery of Potassium and Magnesium Salts from Natural Brines and Calcareous Muds; and I do hereby declare the following to be a full, clear, and exact description of the invention, such as will enable others skilled in the art to which it appertains to make and use the same.

This invention relates particularly to a method of treating certain natural deposits found in the desert regions of the Western States for the recovery of calcium sulphate and the chlorides of sodium, potassium and calcium, and carbonates of magnesium and potassium and the oxide of magnesium.

The natural deposits referred to consist of natural brine and a calcareous marl or mud carrying a certain amount of water soluble and water insoluble potassium.

The deposits or mud flats in which the brine and mud are found are usually flat desert areas, the mud surface of which is usually dry, but beneath the surface, brine is found.

The brine contains potassium, sodium and magnesium chlorides in varying proportions and degrees of concentration, but the sodium chloride is usually present in the brine in large excess. A certain amount of sulphate is also frequently present.

Calcium carbonate is found in the heavy plastic brine-saturated mud. The mud also contains water-insoluble potassium, usually in loose chemical combination with the mud or marl. No practical commercial method of recovering this insoluble potassium from the mud has heretofore been devised, so far as I am aware and is herein described for the first time.

It is one of the principal objects of my present invention to provide a simple and relatively inexpensive method by which the values contained in the brine and the values contained in the mud can be recovered, advantage being taken of the various chemical constituents of each to enable the values to be recovered from both.

The recovery of sodium chloride and potassium chloride from brines obtained from deposits of a similar nature has already been fully set forth in my co-pending applications, Serial Nos. 332,441 and my Patent No. 1,353,283, to which reference may be had, and of which the present application is a continuation in part.

In those applications, the sodium chloride was described as being obtained by solar evaporation and mixed potassium chloride and sodium chloride salts were obtained by a second or further solar evaporation. This mixed salt, containing approximately twenty-five per cent KCl constituted the chief source of the crude material from which refined potassium chloride was produced. The solar production of the crude mixed salt leaves a by-product liquor containing a large amount of magnesium chloride which was recovered by evaporation.

This magnesium chloride mother liquor comprises a part of the raw material that is used in my present method.

The methods referred to, however, made no use of the brine-impregnated calcareous mud which underlies the surface deposits for an unknown depth, and are, to a certain extent, limited to use with brines containing a relatively small proportion of sulphate.

This mud is extremely plastic and is usually impregnated with brine. It frequently contains about 50 per cent water-insoluble material, 11 per cent water-soluble salts and 32 per cent moisture. A thoroughly washed and dried portion of the mud has been found to contain approximately:

|  | Per cent. |
|---|---|
| Calcium carbonate | 72 |
| Magnesium carbonate | 6 |
| Iron and aluminum oxide | 4 |
| Silica | 13 |

The original moist mud has been found to contain 6 per cent $K_2O$ (equivalent to about 10 per cent potassium chloride) partly in a water-soluble and partly in a water-insoluble form.

The above approximate analysis does not show the determination of $K_2O$, since the $K_2O$ content of the mud varies at various locations and at different depths. The water insoluble potash contents of the mud may under certain conditions be entirely washed out.

My present invention employs the methods of the above named applications for the recovery of sodium and potassium chloride from the brine, and the production of the said magnesium chloride by-product liquor. It also includes certain further steps by which the calcareous mud combined with the products obtained from the magnesium chloride liquor and a part of the potassium chloride produced by the previously described process may be converted into a number of additional and valuable by-products, namely, magnesium oxide, magnesium carbonate, potassium carbonate, potassium bicarbonate, calcium chloride and calcium sulphate.

The present method contemplates the utilization of practically all of the values not only in the brine, but also in the marl or mud, and accomplishes this result without the necessity of using any re-agents other than those resulting from the various steps of the process itself.

Although the recovery of potassium salts from the above described mud might not by itself be of commercial importance in the development of the potash industry, I have found it to be a fact that the recovery of the potassium contents of the mud and of the brine, and the production of calcium chloride liquor for use in ridding the potassium-bearing brine of sulphates, as well as the production of carbon dioxide gas for use in producing magnesium carbonate and potassium carbonate, is a process that is not only novel, but commercially practicable. The treatment converts a hitherto practically useless natural deposit into a series of commercially valuable products.

My method is not necessarily confined to the employment of the specific muds and brines of the natural deposits referred to, for it is obvious that the same method of recovering the carbonates of magnesium and potassium and the oxide of magnesium could be applied if limestone instead of marl were employed.

I will, however, for purpose of illustration, describe my method as applied to the brine and to mud having the characteristics of the deposits referred to.

The drawing is a diagrammatic flow sheet showing the various steps of the process for completely recovering the values contained in the brine and the mud.

Solar vats, as 1, 2, 3 are provided for treating the brine to recover a mixed salt of sodium and potassium chloride, or if desired, to recover carnalite, in either case leaving a magnesium chloride mother liquor, as in vat 4.

The details of this solar brine treatment and the subsequent refining of the solar salts are fully set forth in the applications previously referred to, and reference may be had to them for the details of the process.

In general, the said refining method comprises dissolving the potassium chloride content of the crude solar salt of vat 2 with a hot liquor, as in dissolver 5, separating or settling, as at 6, cooling the clear liquor to crystallize potassium chloride, as at 7, and filtering and storing potassium chloride, as at 8 and 9.

The solvent liquor used in dissolver 5 is hot; having been heated, as at 10. The liquor is obtained from the brine supply, which may be either a ditch, as indicated at the right in the diagram, or, if the brine contains sulphate, the solvent liquor may be drawn from a solar vat, as 35, the purpose of which will be described later.

On the way from the brine supply to the dissolver 5, the solvent liquor may be first heated, as at 11, and used to wash sodium chloride crystals in the salt washer 12. The sodium chloride, after filtering at 13, is delivered to storage 14.

Solar evaporation may be employed in vat 3 to concentrate the mother liquor from vat 2 and produce carnalite. A dissolver 15 dissolves the magnesium chloride of the carnalite. The resulting mixture of washed salt and magnesium chloride liquor is separated, as at 16. The cool magnesium chloride liquor may be added to the magnesium chloride liquor from vat 4, which is a by-product of the solar evaporation and constitutes the main source of supply of the magnesium chloride liquor used in my method of treating the marl or mud.

In my present process the said magnesium chloride liquor is mixed, as at 17, with magnesium oxide which is preferably obtained from a later step in the process. The liquor is made in such proportions as to obtain a solid consisting essentially of magnesium-oxychloride. This solid is roasted in a kiln 18 at a temperature of six-hundred to seven-hundred-fifty degrees centigrade, preferably by the use of gas or powdered fuel from a fuel supply, 19, the resulting products being chiefly hydrochloric acid gas and magnesium oxide. Part of the magnesium oxide may be stored, as at 20, and marketed and the remainder is divided between the amount which, as noted above, was mixed with the magnesium chloride liquor in 17, and an additional amount to be used in a later step of the process for the production of potassium and magnesium carbonate.

The hydrochloric acid gas produced in the kiln is then brought into intimate contact, as in gas towers 21 and 22, with a supply of the crude calcareous mud or marl (mixed with brine to form a fluid). The resulting products of this gas treatment are carbon dioxide gas and a liquor containing calcium chloride, potassium chloride and other soluble salts. The reaction in this step of the method is well-known, as follows:

$$CaCO_3 + 2HCl = CaCl_2 + H_2O + CO_2.$$

The $CO_2$ is driven off as a gas, while the calcium chloride, which is readily soluble in water, remains behind as a solution, combining with the brine to produce a calcium chloride liquor.

The carbon dioxide gas produced in the gas towers 21 and 22 is employed in the next step of the process. This step consists in carbonating, as in carbonating tower 26, magnesium oxide, obtained from the roasting of the magnesium oxychloride, mixed with potassium chloride obtained from the solar brine treatment and refining processes described in the applications heretofore referred to.

The magnesium oxide, together with the potassium chloride and cold fresh water from supply 27 is brought into intimate contact with the carbon dioxide gas. A double salt of potassium and magnesium carbonate, and magnesium chloride is thereby formed, according to the following chemical reaction:

$$3MgO + 2KCl + 4CO_2 + 9H_2O = 2KHCO_3MgCO_3 4H_2O + MgCl_2.$$

The resulting potassium-magnesium carbonate salt ($KHCO_3MgCO_3 4H_2O$) is separated from the adhering magnesium chloride liquor, as by centrifuge 28 and is then washed with cold water to free it as much as possible from magnesium chloride. The double salt may then be decomposed by agitation with magnesium oxide and cold water in an agitator 29, according to the following chemical re-action:

$$2(MgCO_3 KHCO_3 4H_2O) + MgO + H_2O = \\ 2MgCO_3 3H_2O + MgCO_3 + K_2CO_3 + 4H_2O.$$

The resulting magnesium carbonate may be separated from the adhering potassium carbonate liquor by centrifuging, at 30 and washing with warm water. It is then dried and stored at 31 as commercial magnesium carbonate.

The potassium carbonate liquor may be evaporated for the production of crude potassium carbonate in an evaporator 32, centrifuged at 33 and stored at 34, or it may be treated by well-known means for the production of caustic potash, or for potassium bicarbonate, or for refined potassium carbonate.

It has been mentioned that the hydrochloric acid gas from the kiln is employed in the treatment of the mixed mud and brine, but if only a part of the hydrochloric acid gas is thus employed the remainder may be cooled and condensed in long quartz tubes for the production of hydrochloric acid.

The muddy liquor resulting from the treatment of the mud and brine by hydrochloric acid gas contains original brine plus the previously water-insoluble, but now water-soluble potassium contents of the mud. This calcium-potassium chloride liquor, together with the various suspended insoluble impurities contained in the original mud is pumped to the settling tank 23, where the insoluble material, such as silica and aluminum oxide, are allowed to settle. The clear liquor which consists essentially of a mixture of calcium chloride and original brine plus the previously insoluble, but now water-soluble potassium chloride of the mud is then pumped to the next succeeding vat or solar pond 24 for evaporation and for recovery of potassium chloride substantially as described in applications Serial Nos. 332,441 and 373,183 relative to treatment of brines carrying potassium and magnesium chlorides.

The mother liquor from solar pond 24, consisting essentially of calcium chloride, is then pumped to storage vat 25 and is further concentrated by solar evaporation. Solar concentration of the calcium chloride liquor, therefore, takes place in ponds 23, 24 and 25.

When sulphates and carbonates are present in the original brine, the calcium chloride liquor from 25 may be employed for precipitating such soluble sulphates and carbonates, forming insoluble calcium sulphate and calcium carbonate and a liquor consisting essentially of chlorides, which liquor may be treated for the recovery of potassium and magnesium. The calcium sulphate that is precipitated in vat 35 may be recovered and harvested.

It should be noted that by the use of calcium chloride liquor as re-agent to precipitate the sulphate of the brine as calcium sulphate, a brine consisting essentially of sodium, potassium and magnesium chlorides is obtained, which can be treated as set forth in the said applications and therefore, practically any brine, even those containing considerable sulphate and carbonate may be readily treated by this method.

From the solar concentrated calcium chloride liquor, solid commercial calcium chloride may be obtained by well-known evaporating methods and stored at 36. Where pure calcium chloride is desired, any magnesium salts present in the solar concentrated liquor may be precipitated by the addition of calcium hydroxide, according to the following well-known chemical re-ac- $$CaCl_2 + MgCl_2 + Ca(OH)_2 = 2CaCl_2 + Mg(OH)_2.$$

and the resulting liquor evaporated. The magnesium hydroxide thus precipitated may be washed, to remove all traces of the calcium chloride and then advantageously substituted in place of the magnesium oxide

Having thus described my invention, what I claim and desire to secure by Letters Patent is:

1. The method of recovering potassium and magnesium salts from natural brine and calcareous muds of substantially the character described, comprising, evaporating the brine by solar heat, removing the resulting sodium and potassium chloride and producing magnesium chloride mother liquor, adding magnesium oxide to said mother liquor to form a solid, roasting said solid material to thereby produce hydrochloric acid gas and magnesium oxide, treating a fluid mixture of said mud and brine with said hydrochloric acid gas, thereby producing carbon dioxide gas, mixing magnesium oxide and potassium chloride and water and treating the mixture with carbon dioxide gas, thereby producing a double salt of potassium and magnesium carbonate and magnesium chloride.

2. The method of recovering potassium and magnesium salts from natural brine and calcareous muds of substantially the character described, comprising, evaporating the brine by solar heat, removing the resulting sodium and potassium chloride and producing magnesium chloride mother liquor, adding magnesium oxide to said mother liquor to form a solid, roasting said solid material, to thereby produce hydrochloric acid gas and magnesium oxide, treating a fluid mixture of said mud and brine with hydrochloric acid gas, thereby producing carbon dioxide gas and a residual liquor containing original brine, potassium chloride and calcium chloride liquor and insoluble material, settling said liquor and concentrating the clear residual calcium chloride liquor, adding this clear liquor to the original brine to precipitate sulphate therefrom; mixing magnesium oxide and potassium chloride and water and treating the mixture with carbon dioxide gas, thereby producing a double salt of potassium and magnesium carbonate and magnesium chloride.

3. The method of recovering potassium and magnesium salts from natural brine and material containing carbonate of calcium, comprising evaporating the brine by solar heat, removing the resulting sodium and potassium chloride and producing magnesium chloride mother liquor, adding magnesium oxide to said mother liquor to form a solid, roasting said solid material to thereby produce hydrochloric acid gas and magnesium oxide, treating said carbonate-containing material and brine with said hydrochloric acid gas, thereby producing carbon dioxide gas, mixing magnesium oxide and potassium chloride and water and treating the mixture with carbon dioxide gas, thereby producing a double salt of potassium and magnesium carbonate and magnesium chloride.

4. The method of recovering potassium and magnesium salts from brine and a carbonate-bearing material, comprising evaporating the brine, removing the resulting salts and producing a more concentrated liquor consisting essentially of magnesium chloride and water, adding magnesium oxide to said concentrated liquor to form a solid, roasting said solid material to thereby produce hydrochloric acid gas and magnesium oxide, treating said carbonate-bearing material with said hydrochloric acid gas, thereby producing carbon dioxide gas, mixing magnesium oxide and potassium chloride and water, treating the mixture with carbon dioxide gas, thereby producing a double salt of potassium and magnesium carbonate and magnesium chloride.

5. The method of recovering potassium and magnesium salts from brine and material containing carbonate of calcium comprising evaporating the brine and producing a concentrated liquor consisting essentially of magnesium chloride and water, adding magnesium oxide to said concentrated liquor to form a solid, roasting said solid to thereby produce hydrochloric acid gas and magnesium oxide, treating said carbonate-bearing material with said hydrochloric gas thereby producing carbon dioxide gas and a liquor containing calcium chloride, adding a portion of said calcium chloride liquor to the orignal brine to precipitate any soluble sulphate, thereby producing a liquor practically free from sulphate, evaporating said liquor for the production of potassium chloride and magnesium chloride; mixing said magnesium oxide with potassium chloride and water and treating the mixture with said carbon dioxide gas, thereby producing a double salt of potassium and magnesium carbonate; evaporating the remainder of said calcium chloride liquor for the production of calcium chloride.

In testimony whereof, I affix my signature in presence of two witnesses.

JOSEPH L. SILSBEE.

Witnesses:
R. D. Seymour,
H. R. Thomas.